United States Patent Office 3,097,338
Patented July 9, 1963

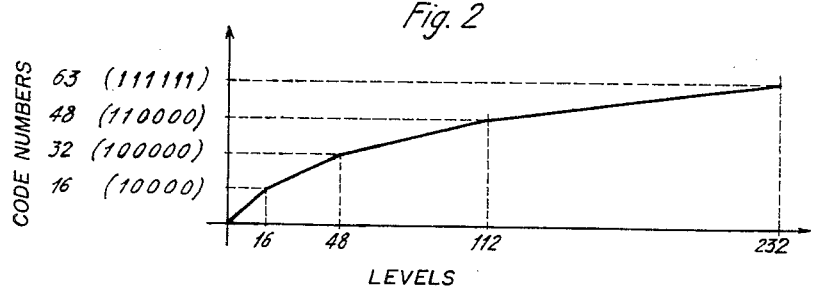
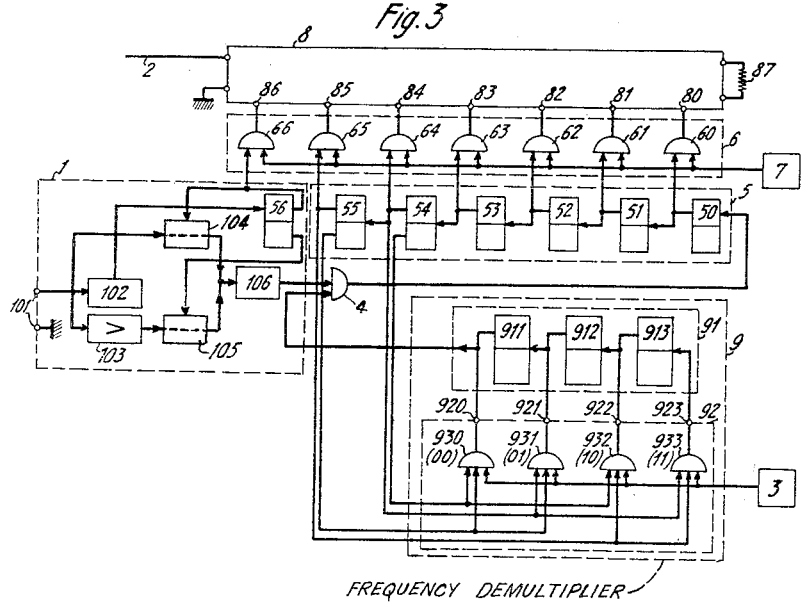

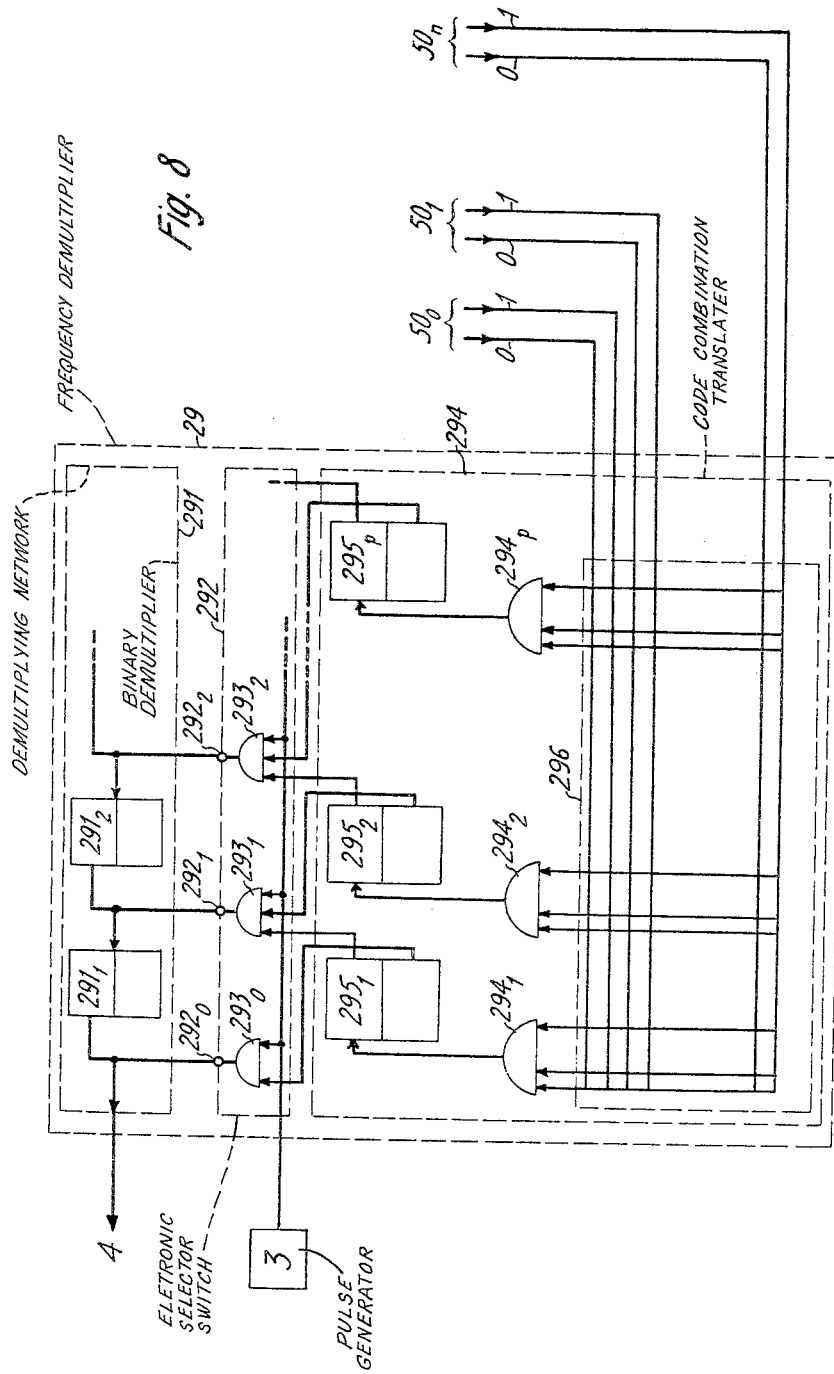

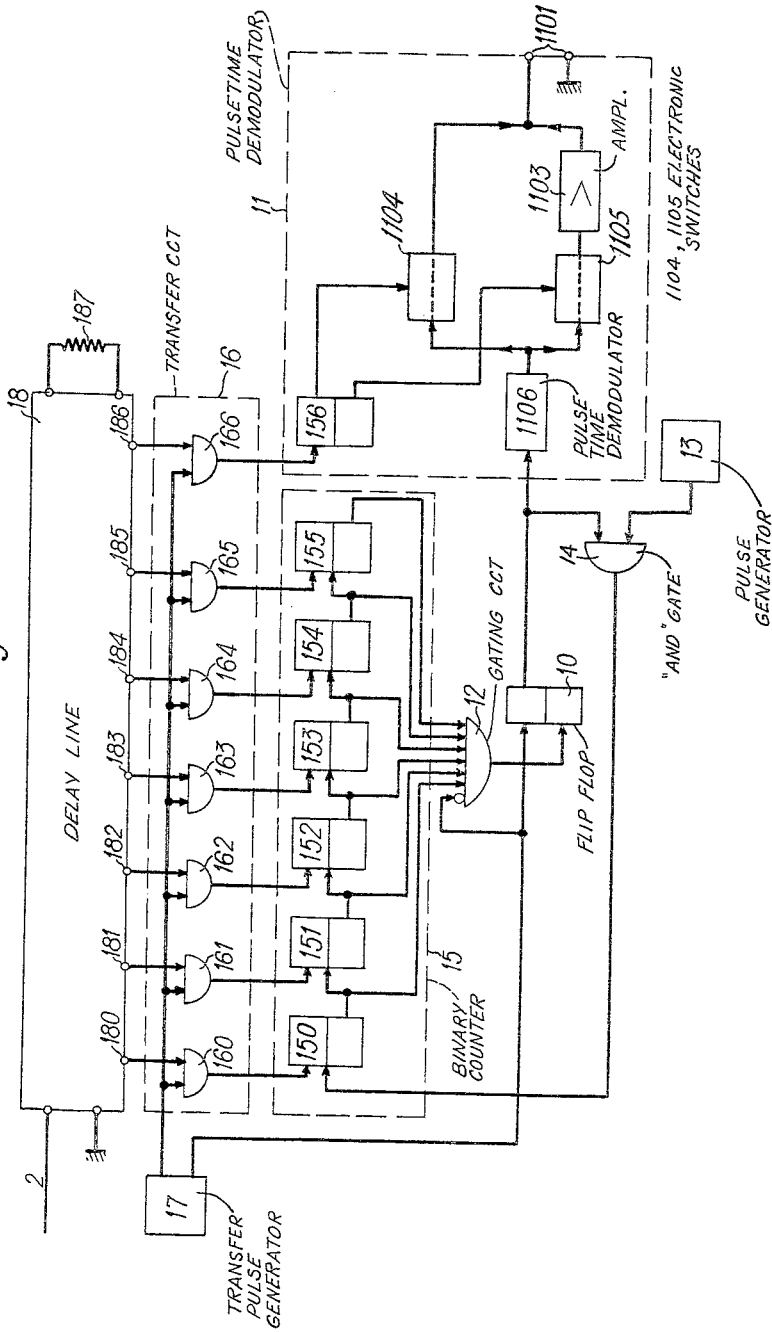

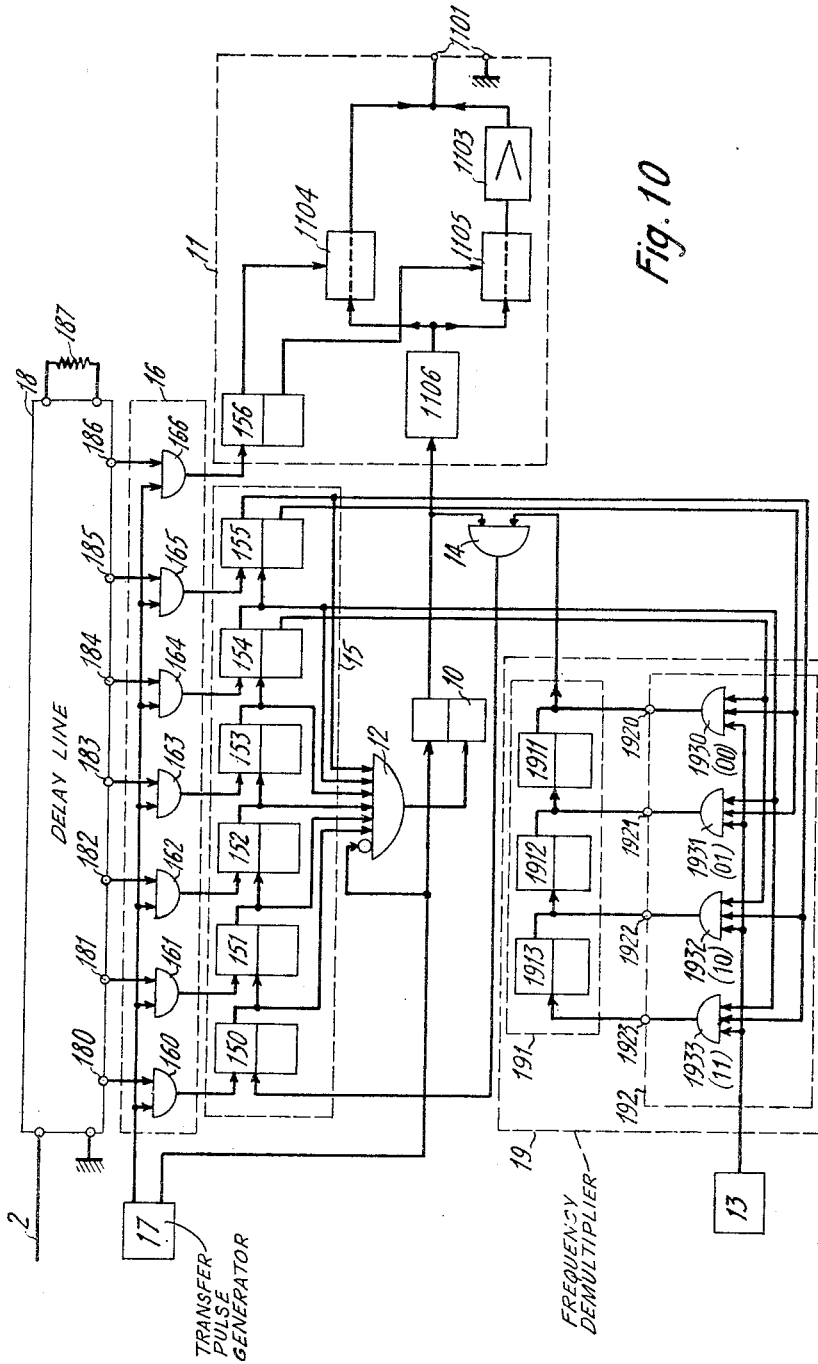

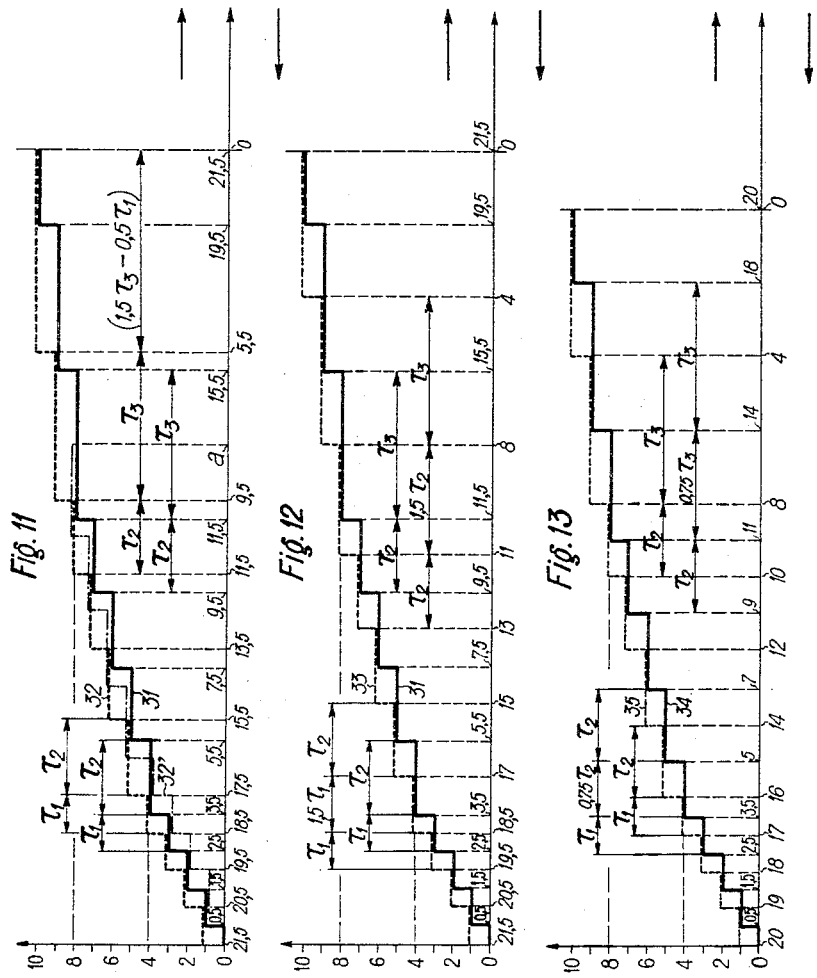

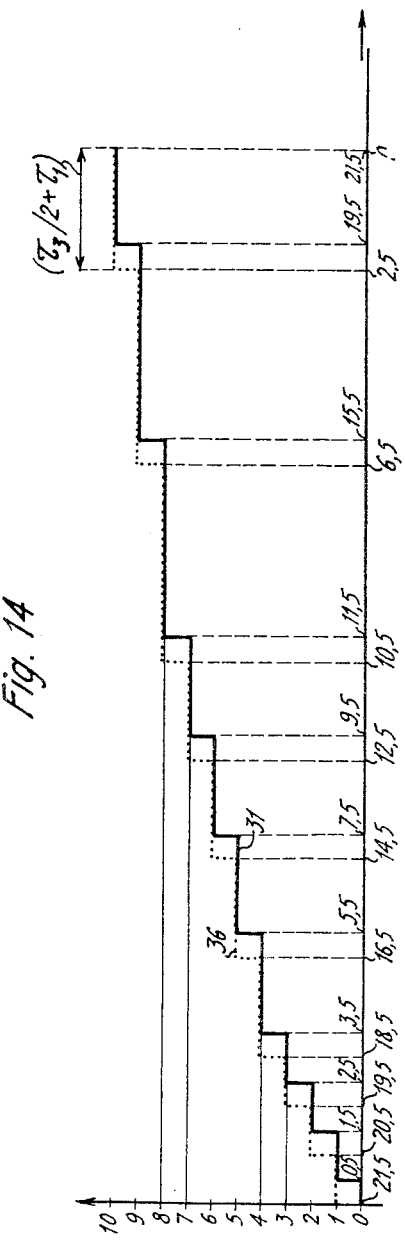
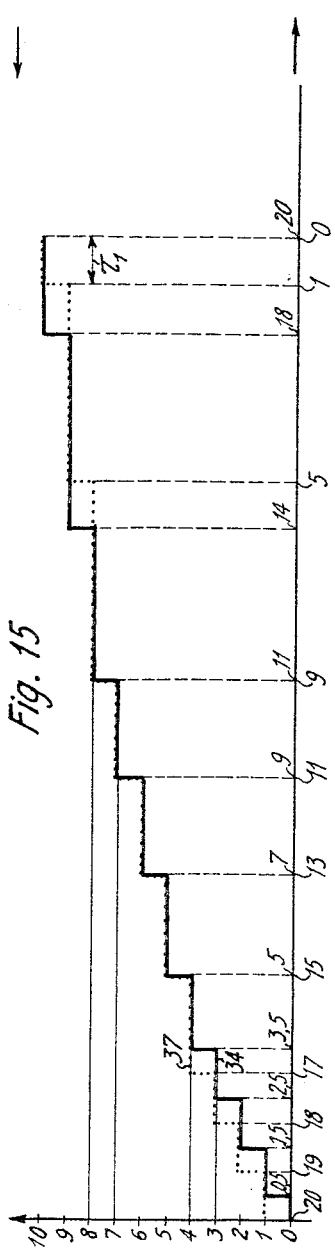
Fig. 14
Fig. 15

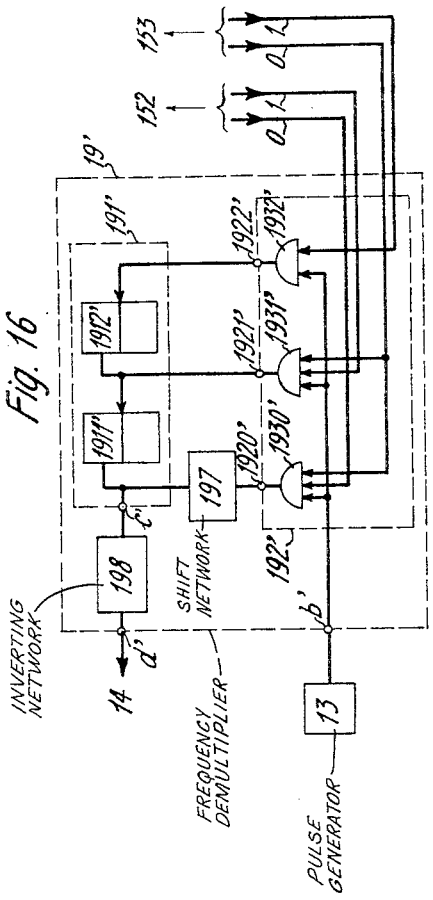
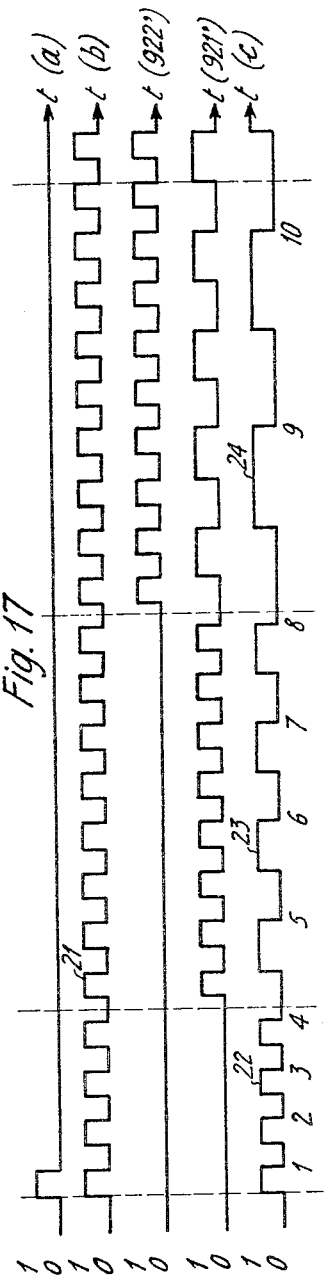

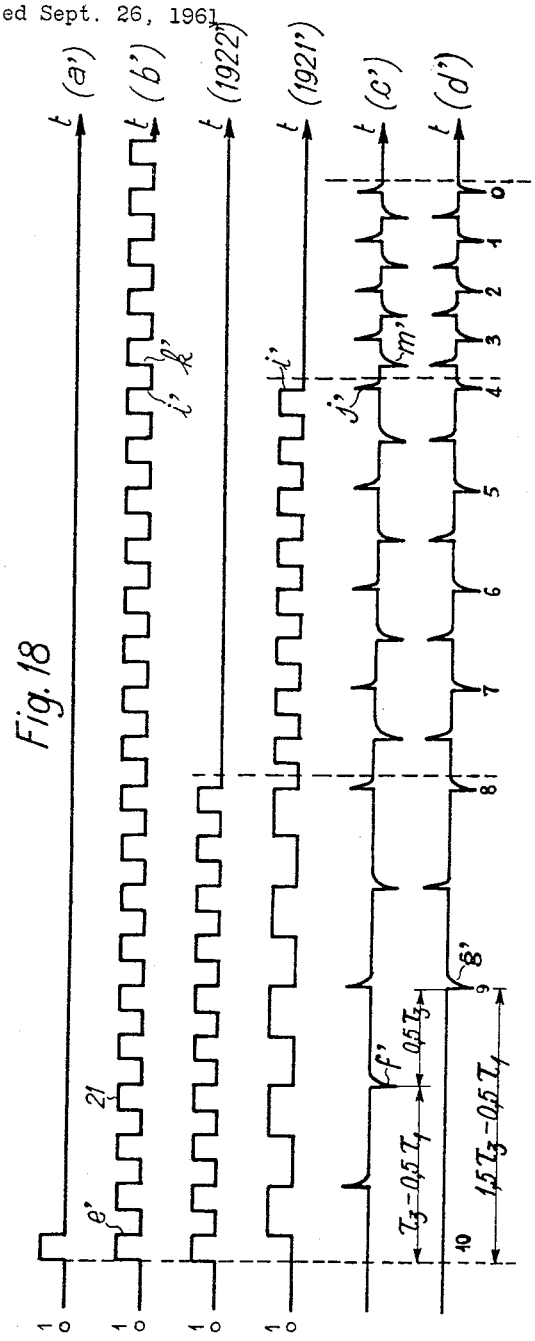
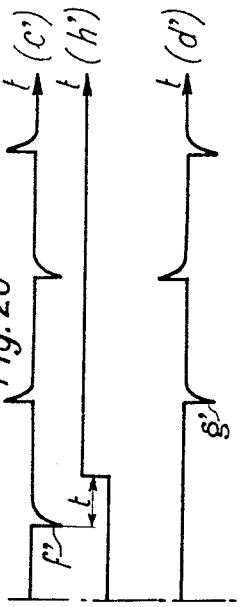
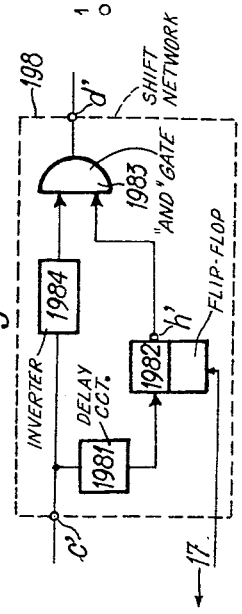
Fig. 18
Fig. 20
Fig. 19

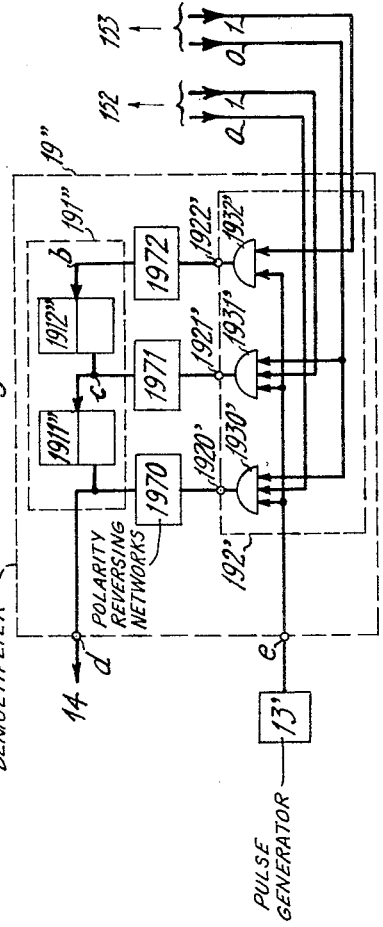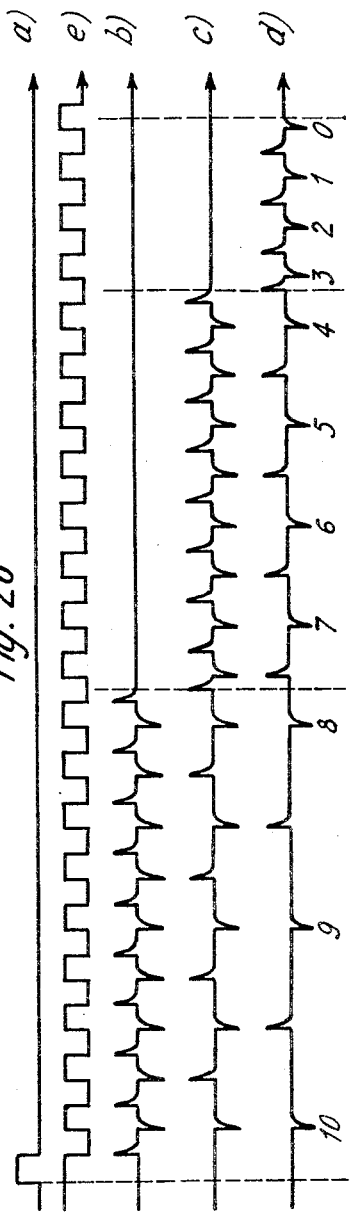

3,097,338
PULSE-CODE MODULATION TRANSMISSION
SYSTEMS
André Eugène Pinet, 22 Rue E. Le Gac, Perros-Guirec,
Cotes du Nord, Saint-Maur, France, and Gérard Battail,
30 Boulevard du Temple, Paris 11, France
Filed Sept. 26, 1961, Ser. No. 140,895
Claims priority, application France Nov. 30, 1960
7 Claims. (Cl. 325—38)

This invention relates to a pulse-code modulation transmission system of the kind wherein the value of an information signal which it is required to transmit, such value being continuously variable in time, such signal hereinafter being referred to as a "modulation signal," is periodically sampled, whereafter the values of the samples thus provided are quantised—i.e., replaced by the nearest whole-number multiple of a basic value known as the "unit quantising level," and then translated into coded groups of binary pulses. The modulation signals which it is required to transmit are, as a rule, of zero mean value, as occurs with speech signals and the signals produced by frequency-division-multiplexing of speech signals. The samples therefore have a positive or negative characteristic. The term "amplitude" will denote hereinafter the absolute value of this characteristic.

It is known that the transmission quality of a pulse-code modulation transmission system depends, inter alia, upon the ratio between the maximum amplitude of the modulation signal and the value of the unit quantising level. Quality, of course, improves in proportion as the quantised signal, the value of which varies in time by level, differs more at any given time from a lesser quantity of the original modulation signal and therefore in proportion as such ratio is greater. The maximum instantaneous separation introduced by the quantising step between the modulation signal and the quantised signal is equal to half or less of the unit quantising level if the quantising system has been appropriately selected.

Consequently, if the unit quantising sample has a constant value throughout the range of amplitudes of the samples to be encoded, transmission quality decreases momentarily when modulation signal amplitude decreases. The quantising level could, therefore, with advantage be made variable, its value increasing with the ampliude of the samples to be encoded.

Various systems have already been proposed to transmit, in the form of a sequence of code combinations, the sample values quantised by a unit quantising level varying with sample amplitude. In some systems, the modulation signal is compressed before quantising and encoding and expanded after decoding. The unit quantising level is therefore continuously variable with amplitude, and such systems have the familiar disadvantage of continuous or analogue compression and expansion systems, connected with the difficulty of providing exactly complementary compression and expansion circuits—i.e., such that a signal which has passed through the circuits in series is, at the output of such circuits, identical with its original self.

In a French Patent 1,261,253 to Andre Eugene Pinet, applied for on March 28, 1963, for a "Pulse-code modulation transmission system," it was proposed that the sign of the sample to be encoded be denoted by a binary digit and that the amplitude of the sample be encoded by the possible range of variation of modulation signal amplitude being subdivided into a number of partial ranges, known as encoding ranges, within which the unit quantising level has a constant value specific for each particular encoding range. The unit quantising level is therefore variable intermittently and in steps with the amplitude. Some sort of harmonisation can then be provided between, on the one hand, quantising and encoding, and, on the other hand, decoding, accuracy being similar to that of numerical transmission systems as compared with analogue transmission systems. In this earlier application the unit quantising level is an amplitude varying by a factor of two as between consecutive encoding ranges, and encoding takes the form of a series of divisions of the amplitude of each encoding range (or of the part occupied by the amplitude of the sample in the encoding range of highest order which is, as a rule, partly unoccupied) by the unit quantising level associated with such range, and of addition of the quotients of such divisions. Although the system described in this earlier application has proved satisfactory, the operation of dividing one voltage, representing the sample, by another voltage, representing the unit quantising level, cannot be performed readily and the system is fairly complicated.

Also known are encoding systems wherein periodic samplings of a modulation signal are converted into pulses of variable duration proportional to the value of the corresponding sample, hereinafter referred to as "sample pulses"; and wherein the duration of the pulse is quantised and encoded by pulse counting. The number of counting pulses contained in a time interval equal to the duration of the sample pulse, such number being hereinafter called the "code number," is equal to the quantised measurement of such duration taking as unit of time the interval between two counting pulses, such unit of time hereinafter being referred to as "unit quantising duration." The counting pulses are applied to a binary counter which records the code number in its binary form, hereinafter referred to as "code combination"; such combination is transmitted over a transmission channel in the form of binary pulses called "code elements." In such encoding systems the counting pulse generator is a fixed-frequency generator.

The transmission system according to the invention comprises an encoding system and a decoding system.

According to the invention, the amplitude of each sample is converted into a sample pulse of a duration proportional to the amplitude of the original sample; such sample pulse operates an encoding system which is derived from the prior art system by the pulse counting generator being replaced by a fixed-frequency pulse generator followed by an intermittent-frequency demultiplier comprising a number of binary demultipliers, the number thereof which are inserted between the generator and the binary counter being controlled by an electronic selector switch controlled by the counter. At the start of counting no binary demultiplier is inserted. Immediately a particular code combination, hereinafter called the "transition code-combination," is briefly recorded in the binary counter during counting, the electronic selector switch inserts the first binary demultiplier into the chain of binary demultipliers forming the intermittent frequency demultiplier. Consequently, the period of the counting pulses is doubled and so the unit quantising duration is also doubled. The occurrence of other transition code combinations leads each time to the insertion of one more binary demultiplier into the chain of binary demultipliers and therefore to a doubling of the previous period.

The compression pattern resulting can be illustrated graphically. If the code number corresponding to a sample pulse is plotted along the ordinate, and the quantised measurement of such pulse is plotted along the abscissa (taking the unit quantising level as unit), the resultant points lie along a broken line formed by right segments, the first of which, of unit slope, starts from the origin, the second of which has a slope of ½ the third of a slope of ¼ and so on. The points of connection of such segments have as ordinates the transition code numbers and their abscissae will hereinafter be called "encoding range limits."

The sign of the sample is transmitted as a code element added to the code combination representing the amplitude, as has just been stated.

The decoding system restores the amplitude of the sample through the agency of a sample pulse, the duration of which is appropriately derived from the code number; to this end, the coding system comprises a counter which, having stored the code combination for the received sample pulse, counts backwards from such number to zero, disconnecting one more binary demultiplier whenever it passes through a transition code combination.

Of course, the sample pulse restored from its code combination must at the receiving end have a duration as close as possible to the duration of the original sample pulse—i.e., the maximum difference between the original duration and the restored dluration must not exceed half the greatest unit quantising duration used at encoding. This accuracy depends upon the arrangement in time of the counting (or backward counting) pulse train relatively to the forward front of the (original or restored) sample pulse and relatively to the time of occurrence of a transition code combination; the encoding and decoding arrangements which can be used also depend one upon another (the conditions which had to be met because of this will hereinafter be briefly referred to as "encoding-decoding correspondence conditions").

The invention therefore also relates to associated encoding and decoding systems providing desired compression patterns; for each such pattern there are a number of pulse-counting systems and a number of encoding-decoding correspondence conditions; finally, a single such system and condition can be provided by a number of means. Therefore many possible variants of the invention but all of them use common means appropriately adapted. To make such means readily apparent, a number of variants will be described, the description being limited:

With regard to compression patterns, first to a description of the invention as a whole, with provision for embodying three very simple and interesting compression patterns, then a more complicated system of use where the transition combinations are selected arbitrarily;

With regard to the counting and backward counting pulse systems and the encoding-decoding correspondence conditions, to giving five possible patterns, and With regard to the effective embodiment of the last-mentioned patterns, to an exemplary description, in the case of an arbitrary but convenient choice of the factors hereinbefore mentioned, of how the systems previously described without any reference to the requirements of restoration accuracy can meet the requirements of such accuracy in the case of three of the five patterns mentioned.

The invention will now be described in detail in accordance with the schedule just set forth, reference being made to the accompanying drawings wherein:

FIGURES 2, 4 and 6 illustrate intermittent compression patterns in which the transition code combinations are very simple binary numbers;

FIGURES 3, 5 and 7 illustrate encoding systems according to the invention wherein the compression patterns are those of FIGURES 2, 4 and 6 respectively; FIGURE 8 illustrates an encoding system according to the invention of use where the transition code combinations are random;

FIGURE 9 illustrates a prior art decoder for time-modulated pulses, the decoder operating by counting backwards and using a constant unit quantising duration;

FIGURE 10 illustrates a decoder according to the invention of use in association with the encoder shown in FIGURE 3;

FIGURES 11–15 are diagrams showing the respective conditions of placing in time of the counting and backward counting pulses, of the forward front of the sample pulse, and of the times of occurrence of the transition code combinations, for the encoding-decoding correspondence conditions previously referred to;

FIGURE 16 illustrates a decoder in the event of the correspondence between encoding and decoding as shown in FIGURE 11;

FIGURE 17 is a diagram showing wave forms of signals at various places in the encoder shown in FIGURE 3;

FIGURE 18 is a diagram of wave forms of signals in various places of the decoder shown in FIGURE 16;

FIGURES 19 and 20 show a shift network disposed in the decoder shown in FIGURE 16 and also show the wave forms of signals at various places in such network;

FIGURE 25 illustrates a part of a decoder in the case of correspondence between encoding and decoding as shown in FIGURE 15, and FIGURE 26 is a diagram of wave forms of signals at various places in the decoder shown in FIGURE 25.

Figure 1:
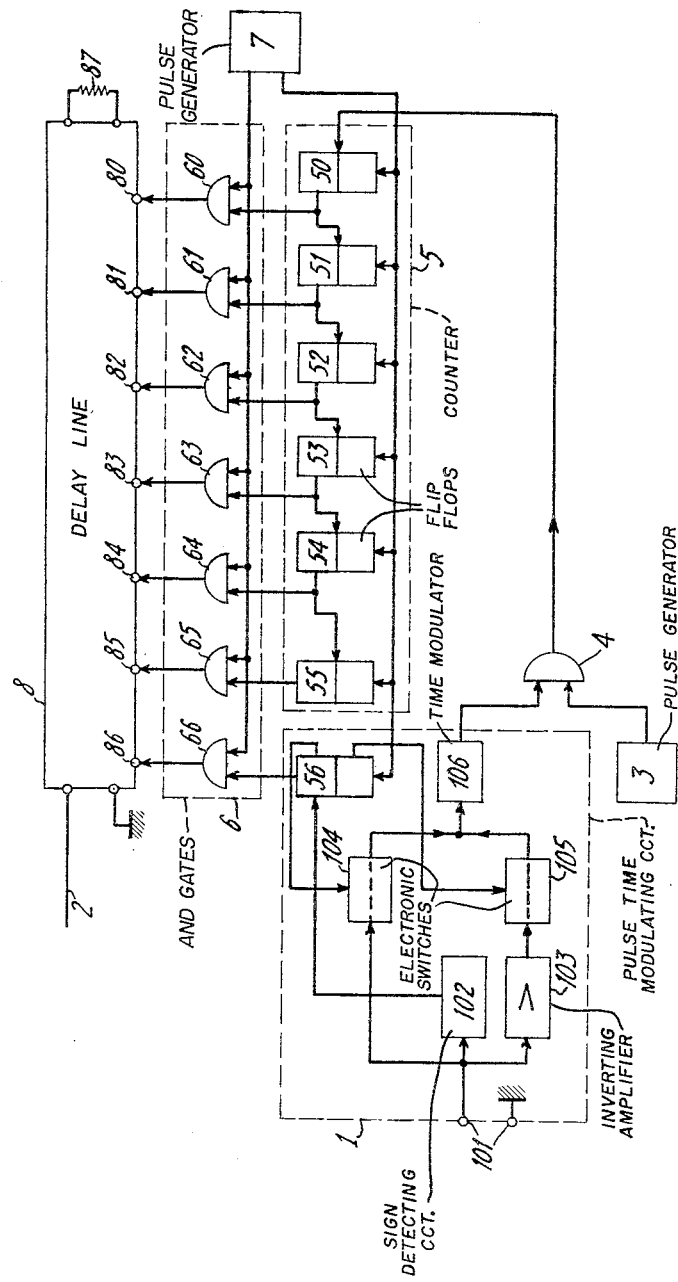
FIGURE 1 illustrates a prior art system for encoding time-modulated pulses, using a constant unit quantising duration.

FIGURE 1 illustrates a prior art encoder associated with a prior art circuit for signed detection and time-modulating pulses. The encoder comprises a sign-detecting and pulse-time-modulating circuit 1 having an input 101 to which are applied samples of the signal to be encoded, the encoder also comprising: a counting pulse generator 3, a circuit 4 which in its simplest form is an and-gate circuit; a binary counter 5 formed by a cascaded network of flip-flops 50–55; a transfer or read-in circuit 6 formed by as many and-gate circuits 60–65 as there are flip-flops in the counter 5 plus one, 66; a transfer and zero-resetting pulse generator 7 for periodically opening all the and-gates 60–66 together and resetting the counter to zero; and a delay line 8 having as many connections 80–86, which are evenly spaced apart from one another, as there are and-gates in the transfer circuit, such connection being connected to the outputs of such and-gates, the delay line being terminated at one end by a resistance 87 equal to its characteristic resistance and at the other end being connected to a transmission channel 2.

The prior art encoder as shown in FIGURE 1 operates as follows:

The and-gate 4 passes as many counting pulses produced by the generator 3 as the times which the period of such counting pulses is contained in the duration of the time-modulated pulse produced by the circuit 1. Such counting pulses are counted by the counter 5 and at the completion of counting each flip-flop 50–55 is in a state representing the binary digit of the binary order or weight corresponding to the rank of such flip-flop. The flip-flops 50–55 therefore store the binary digits or code elements of orders zero, one, two, three, four and five of the sample pulse code. At periodically recurring times corresponding to the transfer pulses produced by the transfer generator 7, the code elements are applied in parallel to the delay line 8 and transmitted serially therethrough to the transmission channel 2.

The sign-detecting and pulse-time-modulation circuit 1 comprises: a sign-detecting circuit 102; a sign flip-flop 56 which is controlled by the sign-detecting circuit 102 and which takes up one or the other state depending upon whether the sign of the sample is positive or negative; an inverting amplifier 103; two electronic switches 104, 105 respectively operated by the sign flip-flop 56 in the "one" and in the "zero" position; and the actual time modulator 106. It will be apparent that a positive sample is applied to the time modulator 106 through the closed switch 104, and that the polarity of a negative sample is reversed in the inverting amplifier 103 and only after this reversal of polarity is the sample applied to the time modulator 106 through the closed switch 105. The time modulator 106 therefore receives a quantity of constant sign representing sample amplitude.

Of course, the delay line 8 can be replaced by means for sequentially opening the and-gates 60–66, in which case the outputs thereof are connected to the transmission channel 2 in parallel.

The encoder according to the invention is illustrated in FIGURE 3 for the case where the compression pattern is that shown in FIGURE 2. Elements which are the same as or similar to the elements shown in FIGURE 1 have the same references. Disposed between the counting pulse generator 3 and the and-gate circuit 4 is a frequency-demultiplying circuit 9 which divides the frequency of the generator 3 and which is controlled by the counter 5. As already explained in the opening part hereof, the variable quantising level, which is in this case the recurrence period of the output pulses of the demultiplier 9, must be rendered variable by steps in dependence upon the duration of the sample pulse which is translated by the number marked by the counter 5.

The demultiplier 9, the demultiplication factor of which is variable in steps, is formed by a chain of a number of binary demultipliers arranged as counter, the number of binary demultipliers of the chain being adapted to be varied through the agency of an electronic selector switch controlled by the counter 5. It is assumed in FIGURE 3 that the compression pattern is as in FIGURE 2 where the encoding range limits have a duration of zero, sixteen, forty-eight, hundred and twelve and two hundred and thirty-two duration levels, and the transition code numbers are sixteen, thirty-two and forty-eight, the highest code number being, of course, sixty-three (the sixty-four levels considered are numbered from zero).

The frequency demultiplier 9 (FIG. 3) comprises a number of binary demultipliers 91 and an electronic selector switch 92 which ensures that the generator 3 can deliver operatively only to one of the four channels extending to terminals 920–923. The system 91 comprises three binary demultipliers 911–913 arranged as a binary counting chain, each demultiplier being formed by a symmetrically driven flip-flop. All three flip-flops are introduced between the generator 3 and the gating circuit 4, and a demultiplication factor of eight exists when the generator 3 is connected to terminal 923; only two are inserted, with a resultant demultiplication factor of four, if generator 3 is connected to terminal 922; and only one is inserted, with a resultant demultiplication factor of two, if generator 3 is connected to terminal 921; finally, no demultiplier is inserted, with a resultant demultiplication factor of unity, if generator 3 is connected to terminal 920. The generator 3 is connected to terminals 920–923 through respective and-gates 930–933. And-gate 930 is open when the binary digits of binary orders five and four of the counter 5 are 0 and 0 respectively— i.e., up to the code number 16; and-gate 931 is open when the binary digits of the same two binary orders are 0 and 1 respectively—i.e., from code number 16 to code number 32: and-gate 932 is open when the binary digits are 1 and 0 respectively—i.e., from code number 32 to code number 48 and and-gate 933 is open when the binary digits are 1 and 1 respectively—i.e., from code number 48 to code number 63.

It will be apparent that code numbers 0 to 16 correspond to levels 0 to 16, and code numbers 16 to 32 correspond to levels 16 to 48; since in this encoding range the demultiplication factor is two. The code numbers 32 to 48 correspond to levels 48–112 since in this encoding range the demultiplication factor is four. Finally, the coding numbers 48 to 63 correspond to levels 112 to 232 since in this encoding range the demultiplication factor is eight.

Figure 4:
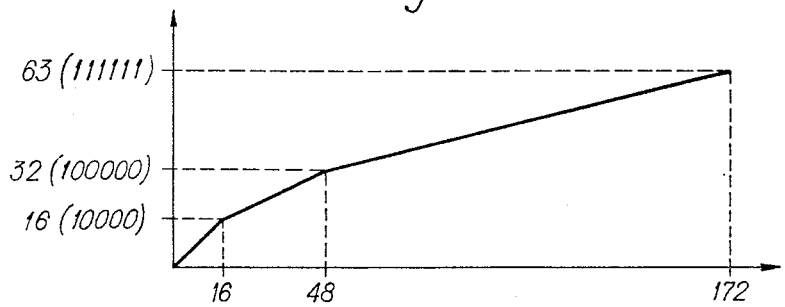
Figure 5:
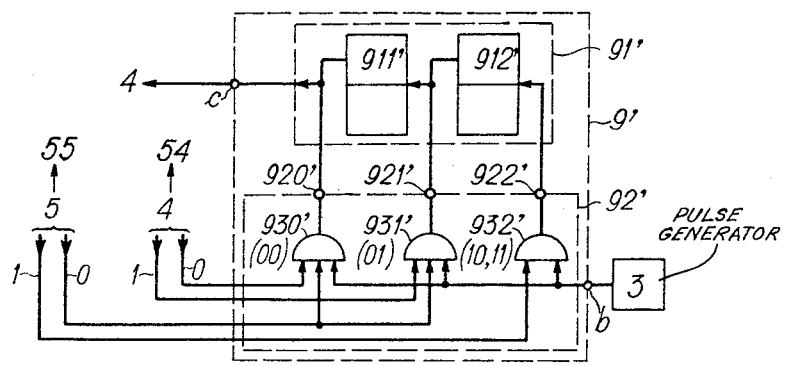

The frequency demultiplier 9 becomes as 9' in FIGURE 5 when the compression pattern is as shown in FIGURE 4. There are three possible demultiplication factors: four, when binary demultipliers $911'$, $912'$ of chain $91'$ are both in operation (generator 3 connected to terminal $922'$) two, when only the binary demultiplier $911'$ is in operation (generator 3 connected to terminal $921'$) and only one, when no binary demultiplier is in operation (generator 3 connected to terminal $920'$). The and-gate $930'$ connecting the generator 3 to the terminal $920'$ is open when the binary digits of binary orders five and four of the counter 5 are 0 and 0 respectively; the and-gate $931'$ connecting the generator 3 to the terminal $921'$ is open when the binary digits of binary orders five and four are 0 and 1 respectively; and the and-gate $932'$ connecting the generator 3 to the terminal $922'$ is open when the binary digit of binary order five is 1, whatever the binary digit of binary order four.

Clearly, the frequency demultiplier 9' shown in FIGURE 5 provides a count of up to 16 with demultiplication by a factor of unity, counting from 16 to 48 being with a demultiplication factor of two, while from forty-eight to hundred and seventy-two the demultiplication factor is four.

Figure 6:
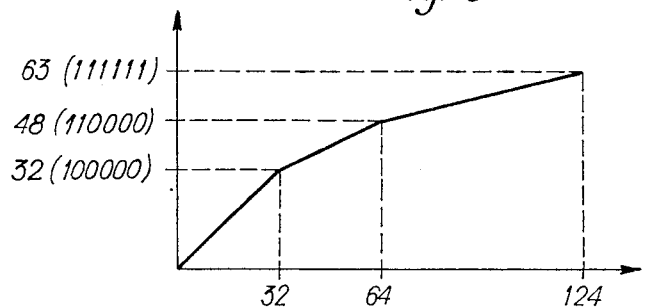
Figure 7:
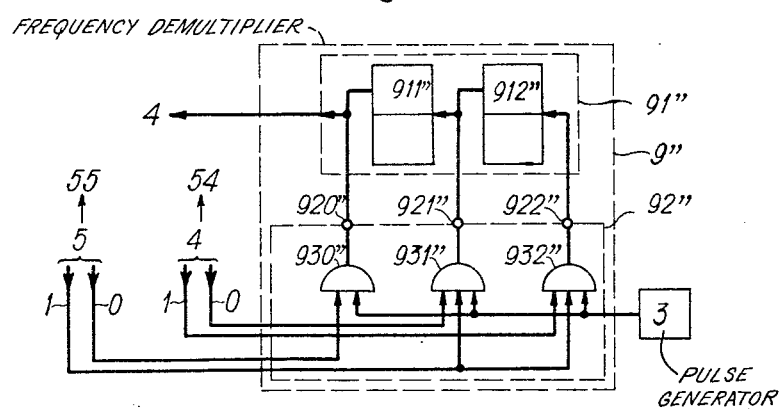

The frequency demultiplier 9 becomes as 9" in FIGURE 7 when the compression pattern is as shown in FIGURE 6. There are three demultiplication factors—of four, when binary demultipliers $911''$, $912''$ of chain $91''$ are both in operation (generator 3 connected to terminal $922''$); of two, when only the binary demultiplier $911''$ is in operation (generator 3 connected to terminal $921''$); and of one, when no binary demultiplier is in operation (generator 3 connected to terminal $920''$). The and-gate $930''$ which connects the generator 3 to the terminal $920''$ is open when the fifth-order binary digit is zero—i.e., up to code number 32; the and-gate $931''$ which connects the generator 3 to the terminal $921''$ is open when the fifth and fourth-order binary digits are 1 and 0 respectively— i.e. up to code number 48—and the gate circuit $932''$ connecting the generator 3 to the terminal $922''$ is open when the fifth and fourth-order binary digits are respectively 1 and 1—i.e., up to code number 63.

It will be apparent that, with the frequency demultiplier 9" shown in FIGURE 7, a count of up to 32 is possible with demultiplication by unity, a count from 32 to 64 is possible with demultiplication by a factor of 2, and a count from 64 to 124 is possible with demultiplication by a factor of four.

In FIGURE 8 a frequency demultiplier 29 is shown which is rather more complicated than the frequency demultipliers hereinbefore described and which is of use where the transition code combinations are numerous and random and, unlike the examples described with reference to FIGURES 3, 5 and 7, are not characterised by the binary value of the highest-order binary digit and of that which is of an immediately lower order.

It will be assumed that there are $(n+1)$ flip-flops in the counter 5, the flip-flops being numbered $50_0$, $50_1$ and so one up to $50_n$ and that there are $(p+1)$ encoding ranges, and therefore $p$ transition code combinations consisting of $(n+1)$ binary digits (it will be assumed that zeros are placed to the left of the digit 1 of highest order so that the total number of binary digits of each transition code combination is $(n+1)$). The frequency demultiplier 29 comprises a group 291 of $p$ binary demultipliers $291_1$, $291_2$ and so on up to $291_p$, and an electronic selector switch 292 formed by $(p+1)$ and-gate circuits $293_0$, $293_1$ and so on up to $293_p$ the respective output terminals $292_0$, $292_1$ and so on up to $292_p$ of which are connected to the flip-flop of the group 291 just as in FIGURES 3, 5 and 7. The inputs of the and-gates $293_0$ to $293_p$ are not directly connected to the flip-flops $50_0$ to $50_n$ of the counter 5 a code combination translator 294 is provided between the counter 5 and the electronic selector switch 292 and comprises a matrix 296 having 2 $(n+1)$ line wires grouped in $(n+1)$ groups of two, each of the two wires of a group corresponding the one to the digit zero and the other to the digit 1 of a desired binary order, and $p(n+1)$ column wires grouped in $p$ groups of $(n+1)$. In each group of $(n+1)$ column wires, each wire is associated with a binary digit of a particular binary order and, if such digit is zero in the transition code combination of the same order as the group of $(n+1)$ wires considered, it is connected to the line wire representing the digit 0 of the same order as the wire in the group, while if the digit is 1, it is connected to the line wire representing the digit 1 of the same binary order as the wire in the group.

Each group of $(n+1)$ column wires is connected to the inputs of gating circuits $294_1$ to $294_p$, the outputs of which are connected to flip-flops $295_1$ to $295_p$. Clearly, when the counter passes through a transition code combination, one of the gating circuits $294_1$ to $294_p$ opens and that of the flip-flops $295_1$ to $295_p$ which corresponds to the opened gating circuit is placed in the "one" state.

The gating circuits $293_0$ to $293_p$ receive the counting pulses at one of their inputs; also, each gating circuit $293_1$ to $293_p$ has an input connected to the output of the part representing the "one" state of that of the flip-flops $295_1$ to $295_p$ of the same order, and another input connected to the output of the part representing the "zero" state of that of the flip-flops $295_1$ to $295_p$ which is of an order greater by one unit. The gating circuit $293_0$ has merely one input connected to the output of the part representing the "zero" state of the flip-flop $295_1$. Consequently, the consecutive appearance of the transition code combinations brings the flip-flops $295_1$ to $295_p$ into the "one" state consecutively in ascending order of indices; because of the connection described between the flip-flops $295_1$ to $295_p$ and the gating circuits $293_0$ to $293_p$, only one of the latter is open at any given time. Since the gating circuit $293_0$ is open at the beginning, the appearance of each transition code combination leads to the opening of the gate having the index equal to the order of such combination and to the closure of the gate of immediately lower index, thus modifying the frequency demultiplier in accordance with the chosen compression pattern.

FIGURE 9 illustrates a decoder for restoring a sample pulse which it is assumed has been quantised with a constant level. Associated with the decoder is a system 11 for demodulating time-modulated pulses and for sign restoration. The complete system can therefore operate in association with the modulator shown in FIGURE 1. In addition to the system 11, FIGURE 9 also shows a backward counting pulse generator 13, a circuit 14 which in its simplest form is an and-gate circuit, a binary counter 15 formed by a cascaded connection of flip-flops 150–155, a transferring or right-in circuit 16 formed by as many and-gate circuits 160–165 as there are flip-flops in the counter 15 plus one and-gate 166, a transfer pulse generator 17 adapted to open the and-gates 160–166 periodically and together, and a delay line 18 having as many connections 180–186, spaced evenly apart from one another, as there are and-gate circuits in the transfer circuit, such connections being connected to the inputs of the and-gate circuits, the delay line being terminated at one end by a resistance 187 equal to its characteristic resistance and at the other end being connected to the transmission channel 2. The decoder also comprises an and-gate circuit 12 having as many inputs as there are flip-flops in the binary counter 15, such inputs being connected to the "zero" output of the binary counter flip-flops, plus one negating input connected to the transfer pulse generator 17, and a time flip-flop 10 disposed between the gating circuit 12 and the sign-detecting and demodulating circuit 11, flip-flopping of the flip-flop 10 into the "one" state being controlled by the transfer pulse generator 17, while flip-flopping into the "zero" state is controlled by the gating circuit 12. The same is arranged to detect the time when all the flip-flops of the counter 15 are simultaneously in the "zero" state—i.e., the time when the counter 15 marks zero.

Whereas the flip-flops 50–55 of the counter 5 were connected in cascade in the sense of increasing counting—i.e., whereas, on the assumption that the flip-flops considered are sensitive to signal fronts corresponding to a changeover from the "one" to the "zero" state, such fronts being referred to hereinafter as "negative fronts," the "one" output of a flip-flop of a given order being connected to the symmetrical input of the flip-flop of immediately higher order—the flip-flops 150–155 of the counter 15 are connected in cascade in the sense of decreasing counting, the "zero" output of a flip-flop of given order being connected at the symmetrical input of the flip-flop of immediately higher order. A counter of this kind, sometimes called a backwards counter, is known in the art and, for information about it, reference may be made to the book entitled "Pulse and Digital Circuits" by J. Millman and H. Taub, McGraw-Hill Book Company ed. 1956, page 335, paragraph 11.6.

The decoder shown in FIGURE 9 operates as follows:

The code elements, including the sign element, which are transmitted in series over the transmission channel 2 appear at each cycle at the terminals 180–186 of the delay line 18. At recurrent times corresponding to the transfer pulses produced by the transfer generator 17, the code elements are applied in parallel to the flip-flops 150–155 through the gating circuits 160–165; simultaneously, the sign element is applied to the sign flip-flop 156 of the sign—restoring and demodulating circuit 11 through the gating circuit 166. The counter 15 behaves like a memory. The transfer pulse is applied to the "one" input of the time flip-flop 10 and also to the negating input of the gating circuit 12, the output of which actuates the "zero" input of the same flip-flop 10. The flip-flop 10 is therefore changed over to the "one" state. When the code elements have been stored in the counter 15, the backward counting pulse generator 13 is started, the generators 13 and 17 being synchronised as will be described hereinafter. These backward counting pulses pass through the gating circuit 14 which is open while the flip-flop 10 is in the "one" state and reduced to zero, unit by unit, the code combination stored in the counter 15 and representing the quantised measurement of the original sample pulse. When the counter 15 has been reset to zero the gating circuit 12 opens so that the time flip-flop 10 is returned to the "zero" state. It will be apparent that the flip-flop 10 has remained in the "one" state for a time equal or substantially equal to the duration of the sample pulse transmitted by the encoder in the form of code elements. The signal of the generator 13 is assumed to have a square wave form.

The pulse from the generator 17 must coincide with a half-period of the generator 13 so that the rear front of the pulse of the generator 17 appears simultaneously with the first of the backward counting pulses.

Consequently, if the code number received is zero, the time flip-flop 10 returns to the zero state after a time equal to half the unit quantising duration. Assuming that the sign of the sample is correctly detected at transmission, even in the case of amplitudes less than half the quantising level, the restoration error is half or less of such level, an amount which is the required approximation.

The time flip-flop 10 is connected to a circuit 1106 for demodulating time-modulated pulses, the output of the circuit 1106 being connected to the output terminal 1101 of the decoder through two paths, one such path comprising the electronic switch 1104 and the other such path comprising the electronic switch 1105 which are respectively identical to the electronic switches 104 and 105 shown in FIGURE 1, the second path also comprising the inverting amplifier 1103. Closure of the switches 1105 and 1104 is respectively dependent upon the part translating the "zero" state and the part translating the "one" state of the sign flip-flop 156. The output 1101 therefore delivers a pulse having an amplitude equal to that which is present at the output of the time demodulator 1106 and which results from the decoding of the combination representing the amplitude of the original sample and the sign of which is equal to the sign represented by the sign element. The samples appearing at the output terminal 1101 are demodulated conventionally by means of a low-pass filter (not shown).

The decoder according to the invention is shown in FIGURE 10 for use in cases where the compression pattern is as shown in FIGURE 2. Elements which are the same as or similar to those shown in FIGURE 9 have the same references. Disposed between the backward counting pulse generator 13 and the and-gate circuit 14 is a frequency demultiplying circuit 19 which divides the frequency of the generator 13 and which is controlled by the counter 15. The recurrence period of the output pulses of the demultiplier 19 must be made variable in steps in dependence upon the duration of the sample pulse which is translated by the number marked by the counter 15.

The demultiplier 19, the demultiplication factor of which is variable stepwise, is formed by a chain comprising a number of binary demultipliers arranged as a counter, the number of binary demultipliers of the chain being adapted to be varied by means of a selector switch controlled by the counter 15.

It is assumed in FIGURE 10 that the compression pattern is the same as in FIGURE 2 where the encoding range limits are zero, sixteen, forty eight, one hundred and twelve and two hundred and thirty two time levels, and the transition code numbers are sixteen, thirty two and forty eight, the maximum possible code number being sixty-three.

The frequency demultiplier 19 shown in FIGURE 10 comprises a binary multiplying system 191 and an electronic selector switch 192. The system 191 comprises three binary demultipliers 1911, 1912, 1913. If the generator 13 is connected to terminal 1923 of switch 192, all three demultipliers 1911–1913 are disposed between the generator 13 and the gating circuit 14 and the demultiplication factor is 8. If the generator 13 is connected to terminal 1922, only two of the demultipliers are operative and the demultiplication factor is four. If the generator 13 is connected to terminal 1921, only one demultiplier is inserted and the demultiplication factor is two. If the generator 13 is connected to terminal 1920, no demultiplier is operative and the demultiplication factor is unity. The generator 13 is connected to terminals 1920–1923 through respective gating circuits 1930–1933. The gating circuits 1930–1933 are connected to flip-flops 154 and 155 of counter 15 exactly as gating circuits 930–933 were connected to flip-flops 54–55 of counter 5. The association between the signals of generators 13 and 17 is the same as previously and for the same reason.

So far nothing has been stated, either for encoding or for decoding, about the occurrence time of the first counting or backward counting pulse relatively to the time of appearance of the forward front of the original or restored sample pulse. If encoding of the original sample pulse is not to introduce any error greater than half the quantising time for near-zero values of the modulation signal, any duration between from one to three times half the lowest quantising duration—i.e., between one and three times the half-period of the counting pulses—should be translated by the code combination 1. Consequently, the first counting pulse must appear one recurrence half-period of the counting pulses after the forward front of the sample pulse. Where the counting pulses are derived from fronts of a particular polarity of a signal having a square wave form, a front of this signal not originating any counting pulse must therefore coincide with the forward front of the sample so that the following front which does originate a counting pulse is remote from the forward front of the sample pulse by half a period of such signal. This matter will be explained in greater detail hereinafter.

Some particulars will now be given about the restoration accuracy of the coded transmission system according to the invention and of the means used to provide this optimum or substantially optimum restoration accuracy—i.e., as previously stated, a description will be given of the modifications to be made to the systems just described.

Restoration accuracy is at an optimum when, the original sample pulse (or encoding range) under consideration having been divided as from its beginning in to time intervals equal to the unit quantising time (associated, if necessary, with such encoding range), the counting pulses arrive at the middle of such time intervals and also if any sample pulse (hereinafter referred to as "normal"), the rear front of which coincides with one of the points of division into such intervals, is exactly restored at decoding. Under the first condition, the original sample pulses translated by the same code number differ from the normal sample pulse by half a unit quantising time or less.

Referring to FIGURES 11 to 15, the code number written into the counter 5 (at encoding) and the code number written into the counter 15 (at decoding) are shown in dependence upon time, on the assumption that the original sample pulse was normal. To achieve the optimum restoration conditions hereinbefore described, the backward counting pulses must be delayed—as a rule, by an amount dependent upon the encoding range— relatively to the forward front of the restored sample pulse, while in some cases, to be described in greater detail hereinafter, either the counting or the backward counting pulse trains must be so staggered upon the occurrence of a transition that the interval separating from a previous pulse the first of the counting or backward counting pulses to follow the occurrence of a transition is only 1.5 times the previous (or future) unit quantising time, the next interval being, of course, twice such time.

In FIGURES 11 to 13 it is assumed that the transition code numbers were four and eight both at transmission and at reception and that the code number representing the original and restored sample pulses was ten. Throughout FIGURES 11 to 15 it is assumed that the time axis is orientated from left to right for encoding and from right to left for decoding.

In the case shown in FIGURE 11, it is assumed that the occurrence of a transition code combination immediately doubles the counting pulse period at transmission and halves the backward counting pulse period at reception. At transmission (curve 31), when transition code combination 4 is reached at time 3.5, the counting pulse period is doubled and passes from $\tau_1$ to $\tau_2$ and, similarly, when the transition code combination 8 is reached at time 11.5, the counting pulse period is doubled and changed from $\tau_2$ to $\tau_3$. At reception (curve 32), when transition code combination 8 is reached at a time 9.5, the backward counting pulse period is halved and changed from $\tau_3$ to $\tau_2$ and, similarly, when transition code combination 4 is reached at time 17.5, the backward counting pulse period is halved and changes from $\tau_2$ to $\tau_1$. In FIGURE 11, therefore, any normal sample pulse is, of course, restored accurately provided that, at reception, the first backward counting pulse is delayed relatively to the forward front of the restored sample pulse by an amount equal to 1.5 times the longest period used in encoding, minus 0.5 times the shortest period used in encoding—i.e., in the case of three encoding ranges $(1.5_3-0.5\tau_1)$. However, restoration is accurate only if the code combination representing the sample pulse is not a transition code combination. If the code combination representing the sample pulse is a transition code combination, for instance, transition code combination 8 (sample pulse finishing at time $a$), the decoding curve becomes curve 32' and, as will be apparent, the duration of the restored sample pulse is too short by a half-period of the second range—i.e., by $\tau_2/2$. Restoration is therefore not always accurate but the error introduced is fairly small and, more particularly, occurs seldom enough (only at transitions) for this pattern to be of practical use. As will be described hereinafter, this is the system requiring the simplest apparatus.

In the case shown in FIGURE 12, it is assumed that at transmission (curve 31), the occurrence of a transition code combination immediately doubles the counting pulse recurrence rate, whereas at reception (curve 33) the occurrence of a transition code combination delays the first backward counting pulse in dependence upon the occurrence time, the delay being equal to a half-period of the lower range. At transmission, when transition code combination 4 is reached at time 3.5, the counting pulse period is doubled and changes from $\tau_1$ to $\tau_2$ and, similarly, when transition code combination 8 is reached at time 11.5, the counting pulse period is doubled and changes from $\tau_2$ to $\tau_3$. At reception, the first period following the time 8 at which transition code combination 8 is reached is $1.5\tau_2$ and not $\tau_2$ and, similarly, the first period following the time 17 at which transition code combination 4 is reached is $1.5\tau_1$ and not $\tau_1$. Consequently, in the system shown in FIGURE 12 any normal sample pulse is restored exactly provided that, at reception, the first backward counting pulse is delayed, relatively to the forward front of the restored sample pulse, by an amount equal to the longest period used in encoding—i.e., $\tau_3$ where three encoding ranges are used. Restoration is errorless, whether or not the sample pulse code combination is a transition code combination.

In the case shown in FIGURE 13, it is assumed that at transmission (curve 34) the occurrence of a transition code combination leads to an advance of the first counting pulse in dependence upon such occurrence time, such advance being equal to a half-period of the lower range or to a quarter-period of the higher range, whereas at reception (curve 35), the occurrence of a transition code combination immediately halves the backward counting pulse recurrence rate. At transmission, the first counting pulse period after the time 3.5 at which the transition code combination 4 is reached is 0.75 $\tau_2$ and not $\tau_2$; similarly, the first period after the time 11 at which transition code combination 8 is reached is 0.75 $\tau_3$ and not $\tau_3$. At reception, when transition code combination 8 is reached at time 8, the backward counting pulse period is halved and changes from $\tau_3$ to $\tau_2$; similarly, when transition code combination 4 is reached at time 16, the backward counting pulse period is halved and changes from $\tau_2$ to $\tau_1$. Consequently, in the system shown in FIGURE 13 any normal sample pulse is restored accurately provided that, at reception, the first backward counting pulse is delayed, relatively to the forward front of the restored sample pulse, by an amount equal to the longest period used in encoding—i.e., $\tau_3$ where three encoding ranges are used. Restoration is error-free, whether or not the sample pulse code combination is a transition code combination.

In FIGURES 14 and 15, the transmission code numbers 4 and 8 are selected at transmission and 3 and 7 at reception—i.e., each reception number is one unit less than the corresponding transition code number at transmission.

It is assumed in FIGURE 14, just as in FIGURE 11, that the occurrence of a code combination immediately doubles the counting pulse period at transmission (and, therefore, the encoding curve of FIGURE 14 is merely the encoding curve 31 of FIGURE 11) and halves the backward counting pulse period at reception. It is apparent from FIGURE 14 that error-free restoration (reception curve 36) is provided if, at reception, the first backward counting pulse is delayed relatively to the forward front of the restored sample pulse by an amount equal to half the longest period used in encoding plus the smallest period used in encoding—i.e., $(\tau_3/2+\tau_1)$ where three encoding ranges are used.

In FIGURE 15 it is assumed, just as in FIGURE 13, that the occurrence of a transition code combination leads at transmission to an advance of the first counting pulse following this time of occurrence, such advance being equal to a quarter of the longest period (the encoding curve of FIGURE 15 is therefore merely the encoding curve 34 of FIGURE 13), and the occurrence of a transition code combination at reception immediately halves the backward counting pulse period. As will be apparent from FIGURE 15, error-free restoration (reception curve 37) is provided if, at reception, the first backward counting pulse is delayed relatively to the forward front of the restored sample pulse by an amount equal to the shortest period used in encoding—i.e., $\tau_1$. This pattern is possible only if not more than three encoding ranges are used.

Before studying in detail examples of arrangements for embodying some of the patterns shown in FIGURES 11–15, a few general remarks will be in order.

In FIGURES 3 and 10, and in the other figures showing the frequency demultipliers 9, 9' and so on or 19, 19' and so on, the "one" output of the flip-flops forming such frequency demultipliers is shown shunted across the connections 920–923 and 1920–1923 respectively through which the signal delivered by the respective generator 3 or 13 is applied. Of course, if, therefore, no operative signal appears at its "one" output and if a binary signal is applied to the connection associated with such output, this signal is perceived at the input of the immediately previous flip-flop. Strictly speaking, the connection between the "one" output of the following flip-flop and the symmetrical input of the previous flip-flop should be by way of an or-gate circuit. This or-gate circuit is not shown in FIGURE 3 and the following figures in order to simplify the figures and also because, in many cases which arise in practice, there is no need to interpose such an or-gate circuit because of the non-reciprocal properties of the constituent elements of the flip-flops.

More generally, whenever one of the two signals apply to the symmetrical input of one of the flip-flops forming the frequency demultipliers 9, 9' and so on and 19, 19' and so on remains at a constant value (zero or one) while the other receives binary signals, the signals operatively perceived at the input of the flip-flop concerned should be the binary signals. It will therefore be assumed, whenever necessary, that a connection between the signal sources and the symmetrical input of the flip-flop is provided only for the high-frequency components of the signals. In other words, the fronts are transmitted without their D.C. components—i.e., the state of the input of a flip-flop at the time when a front may appear does not depend upon the polarity of the first previously received. This kind of connection will hereinafter be referred to as "capacitative or A.C. coupling." In the following drawings, the signals are denoted either in binary form (0 and 1 states along ordinates) or in the form of a signal formed by derivation from a binary signal when the coupling must be of the A.C. kind. The following conventions will also be used in the following description:

All symmetrically actuated flip-flops are sensitive only to the fronts corresponding to a change-over from the "one" state to the "zero" state and such fronts will be referred to as "operative negative fronts" for such flip-flops;

The signals delivered by generators 3 and 13 are signals having a square wave form, and The transfer pulse delivered by the generator 7 or 17 coincides with a half-period in the "one" state of the square wave delivered by the generator 3 (or 13).

In the case of correspondence between encoding and decoding as shown in FIGURE 11, the encoder is as shown in FIGURE 3 where the frequency demultiplier 9 is replaced by the frequency demultiplier 9' of FIGURE 5. However, in order that the transition code combinations may be 4 and 8, as assumed in FIGURE 11, it will be assumed that the counters 5 and 15 contain only four flip-flops—50 to 53 in counter 5, and 150 to 153 in counter 15—and that the connecting wires shown in FIGURE 5 as extending to the flip-flops 54 and 55 actually extend to the flip-flops 52 and 53.

The decoder is as shown in FIGURE 10 except that the frequency demultiplying system 19 is replaced by the system 19' of FIGURE 16 which is similar to the demultiplier 9' of FIGURE 5 but comprises in addition an inverting network 197 introduced between the terminal 1920' of the electronic selector switch 192' and the output of the binary demultiplier 191', and a shift network 198 introduced between the output of the binary demultiplier 191' and the and-gate 14.

FIGURE 17 illustrates the signal wave forms at various places within the frequency demultiplier 9' shown in FIGURE 5 and used for encoding. There can be seen on line $a$ the transfer pulses produced by the transfer pulse generator 7, and on line $b$ the square wave form signal 21 which, through the gating circuit 4, acts by its negative fronts upon the counter 5 as previously described. The sample pulse starts with the forward front of the transfer pulse of line $a$. It will be apparent that the forward front of the sample pulse coincides with an inoperative positive front of the signal 21. Lines 922', 921' and $c$ show the wave forms of the signals appearing at the terminals having the same references in FIGURE 5. As far as transition code number 4, there is at output $c$ a signal 22 identical to signal 21; between the transition code numbers 4 and 8 there is a signal 23 having a period twice that of the signal 22, and beyond transition code number 8 there is a signal 24 having a period four times that of signal 22. As can be seen in FIGURE 17, it is assumed that the frequency demultiplication immediately follows the appearance of a transition code combination—i.e., frequency demultiplication is performed during the first half-period of the signal 21 which follows such appearance.

FIGURE 18 illustrates the wave forms of the signals at various places in the frequency demultiplier 19' of FIGURE 16 used for decoding. There can be seen on line $a'$, the transfer pulses produced by the transfer pulse generator 17, and on line $b'$ the square wave form signal 21, the negative fronts of which are the operative fronts producing backward counting. The sample pulse starts with the forward front of the transfer pulse of line $a'$. It will be apparent that the forward front of the sample pulse coincides with an inoperative positive front of the signal 21. Lines 1922', 1921', $c'$ and $d'$ show the wave forms of the signals appearing at the terminals having the same references in FIGURE 16. It will be apparent in FIGURE 18 that, by choosing the position of the first operative front $e'$ of the signal 21 after the start of the sample pulse, the first backward counting pulse $f'$ delivered at terminal $c'$ is retarded by $(\tau_3-0.5\tau_1)$ relatively to the forward front of the sample pulse. The shift network 198 delays the backward counting pulses from being applied to the counter 15 for a time equal to a half-period of the counting pulses corresponding to the final encoding range of the sample pulse; since in the example described the sample pulse is represented by the code number 10, the shift introduced by network 198 is in this case $0.5\tau_3$. A pulse $g'$ is therefore produced which has a total delay, relatively to the pulses delivered by the generator 13 shown in FIGURE 10, of $(1.5\tau_3-0.5\tau_1)$—i.e., as in the arrangement shown in FIGURE 11. The shift introduced by network 198 is a delay varying with the highest encoding range reached by the code number considered; the design of network 198 will be described hereinafter.

FIGURE 18 shows the need for providing the inverting network 197 associated with the first encoding range. An inoperative positive pulse $j'$ corresponds to the negative front $i'$ and a negative pulse $m'$ should correspond to the front $k'$. If the inverting network 197 did not invert the square signal for the first encoding range, a positive pulse would correspond to the front $k'$.

The shift network 198 is illustrated in FIGURE 19; it reverses the recurrent pulses applied to it but does not transmit the first operative front which it receives, which is equivalent to delaying the recurrent pulse train by half a recurrence period. Between its input $c'$ and its output $d'$ are two paths, the first comprising an inverter 1984 and an and-gate circuit 1983, and the second comprising a delay circuit 1981, a flip-flop 1982 and a gating circuit 1983. The delay $t$ of the delay circuit 1981 is greater than the flip-flopping time of the flip-flop 1982 but less than half a period of the pulses delivered by the generator 13.

The signal wave forms at places $c'$, $h'$, $d'$ are shown in FIGURE 20. The first negative pulse $f'$ appearing at input $c'$ cannot pass through the closed gate 1983 but changes over flip-flop 1982 to the "one" state so that tht gate 1983 opens. The following pulses are transmitted but their polarity is reversed by the inverting network 1984.

Figure 21:
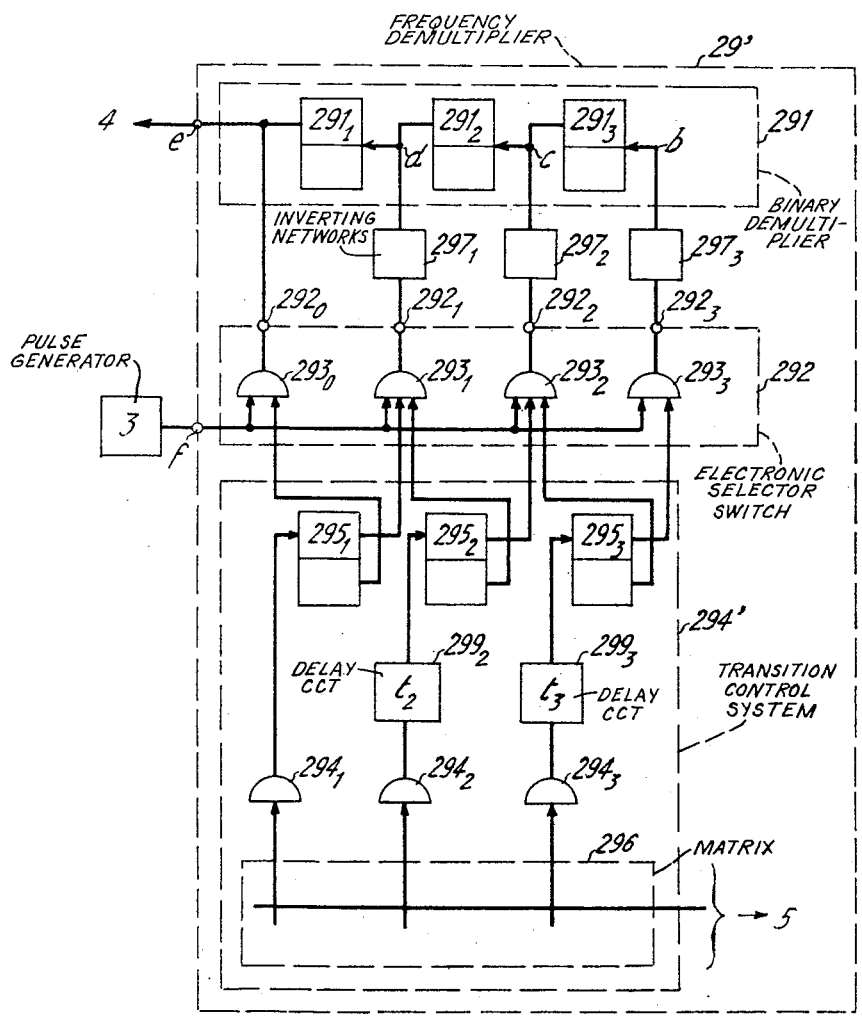
FIGURE 21 illustrates an encoder derived from the encoder shown in FIGURE 8 in the case of correspondence between encoding and decoding as shown in FIGURE 13.
Figure 22:
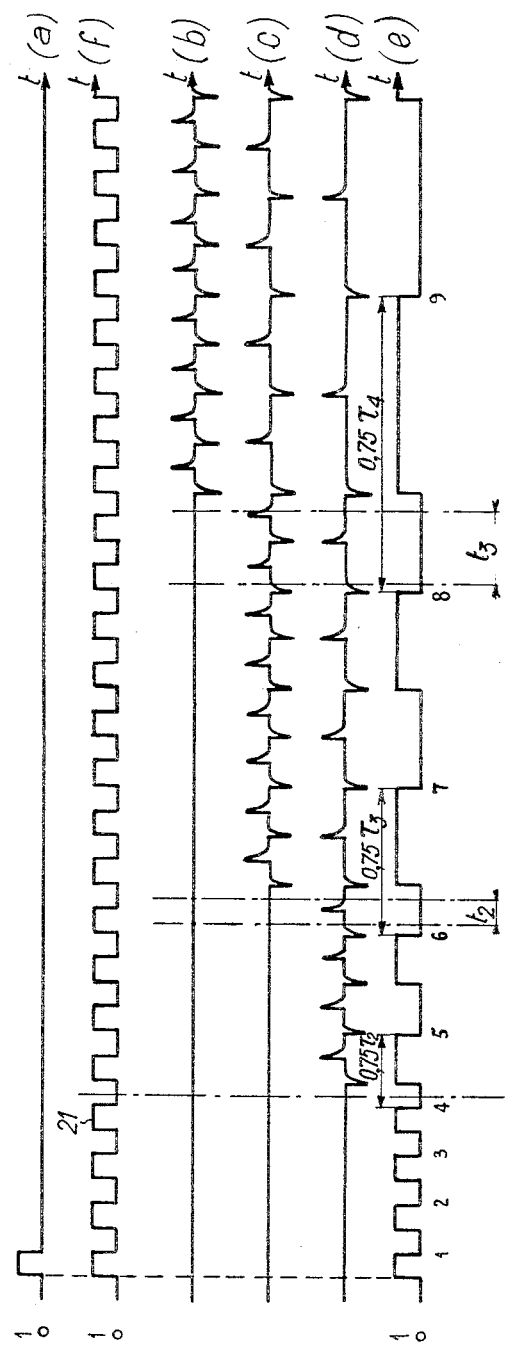
FIGURE 22 is a diagram of wave forms of signals at various places of the encoder shown in FIGURE 21.

FIGURE 21 illustrates the frequency demultiplier 29' of an encoder operating on the encoding-decoding correspondence bias shown in FIGURE 13. The encoder shown in FIGURE 21 is similar to that shown in FIGURE 8. The binary demultiplier chain 291 is identical with the similar chain of FIGURE 8, as are also the electronic selector switch 292 and the matrix 296. The transition control system 294' differs from the corresponding system 294 of FIGURE 8, comprising two extra delay circuits $299_2$ and $299_3$ having delays $t_2$ and $t_3$ respectively and introduced the one between gate circuit $294_2$ and transition flip-flop $295_2$ and the other between gating circuit $294_3$ and transition flip-flop $295_3$. Also, an inverting network $297_1$ is provided between connection $292_1$ and the input of flip-flop $291_1$, an inverting network $297_2$ is provided between connection $292_2$ and the input of flip-flop $291_2$, and an inverting network $297_3$ is provided between connection $292_3$ and the input of flip-flop $291_3$. FIGURE 22 shows on line $a$ the transfer pulses produced by the transfer pulse generator 7 and, on line $f$, the signal 21 which has a square wave form and the negative fronts of which are the operative fronts producing counting. It will be apparent that, as in FIGURES 17 and 18, the forward front of the sample pulse coincides with the inoperative positive front of the signal 21. The lines $b$, $c$, $d$, $e$ show the wave forms of the signals appearing at the terminals having the same letter reference as in FIGURE 1. Delay $t_2$ is from $0.5\tau_1$ to $\tau_1$, and delay $t_3$ is from $3\tau$ to $4\tau_1$.

It will also be assumed that the appearance of a transition code combination in counter 5 leads to the opening of the gate corresponding to the order of such transition, combination after a time not exceeding a half-period of the generator 3. Consequently, and as can be seen in FIGURE 22, the result of the network $294_1$ reversing pulse polarity is that the first operative front after the first transition follows the last operative front of the first encoding range by only $0.75\tau_2$; a delay of $0.75\tau_3$ and $0.75\tau$ at the second and third transitions is provided by delaying the control of demultiplication by the amounts $t_2$ and $t_3$ means of the networks $299_2$ and $299_3$. The arrangement of the operative fronts is therefore as in FIGURE 13.

The decoding associated with this encoding system is performed by means of an arrangement similar to that shown in FIGURE 16 but differing therefrom in that the demultiplying network 192' is replaced, if need be, by a demultiplying network having the same transition code combinations as the network 294' in FIGURE 21 (which latter can therefore be of the form shown in FIGURE 8); also, the shift network 198 of FIGURE 16 is replaced by a constant-delay network providing a delay equal to half a period of the signal of the generator 13.

It is clear from FIGURE 13 that the time interval between the forward front of the restored sample pulse and the first operative front must be equal to one period of the greatest encoding range corresponding to the code number received. In the absence of the network 198 shown in FIGURE 16, such time interval is equal, as already mentioned, to one period of the greatest encoding range used minus a half-period of the pulses delivered by the generator 13. The network 198 of FIGURE 16 can therefore be replaced by a constant-delay network providing a delay equal to such half-period to provide the required pattern as shown in FIGURE 13.

Figure 23:
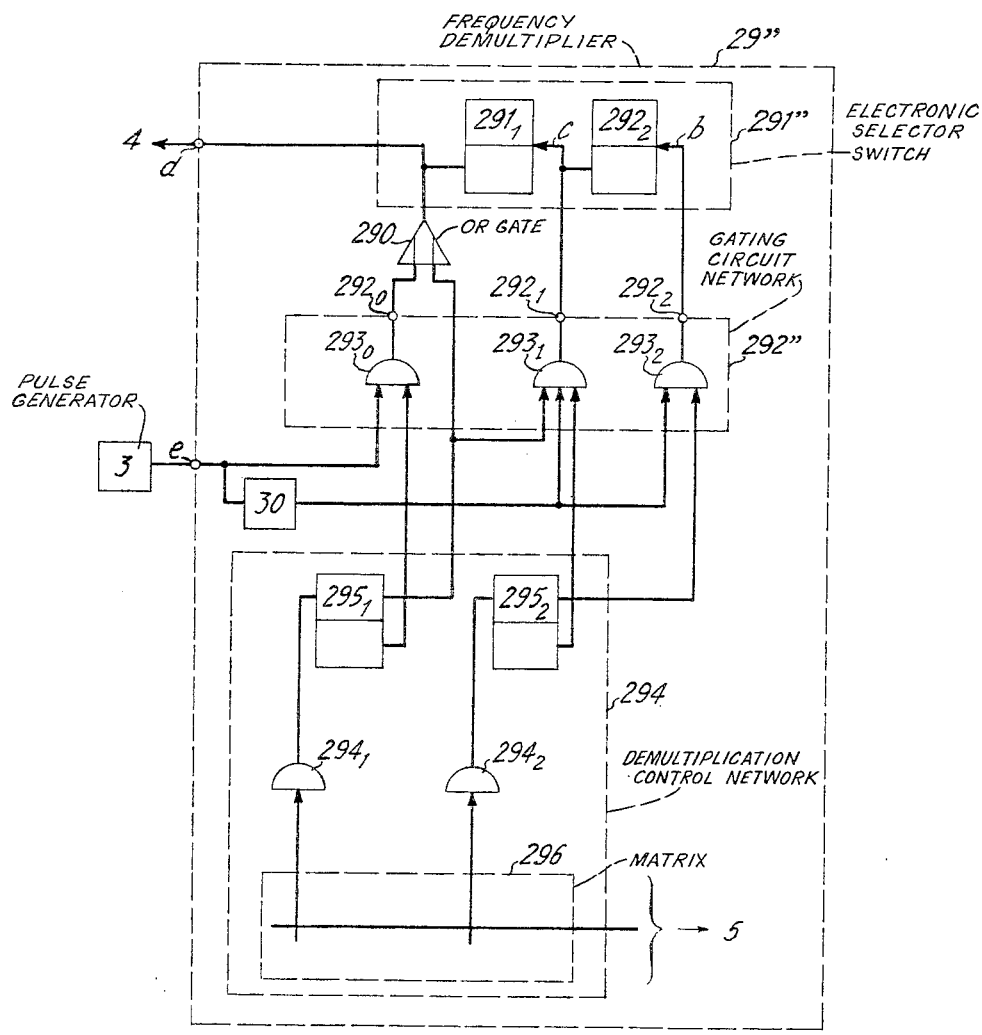
FIGURE 23 illustrates a part of an encoder in the case of correspondence between encoding and decoding as shown in FIGURE 15.

FIGURE 23 illustrates the frequency demultiplier 29" operating on the encoding-decoding correspondence basis shown in FIGURE 15. The demultiplication control network 294 is as shown in FIGURE 8, but is just for three encoding ranges.

The gating circuit network 292" of FIGURE 23 differs from the network 292 of FIGURE 8 in that the and-gate 293 is connected directly to the counting pulse generator 3 but the other two gates $293_1$ and $293_2$ are connected to the generator 3 through the inverting circuit 30. Terminal $292_0$ is not directly connected to the output of the frequency demultiplier 291" but is connected to one of the inputs of the or-gate circuit 290, the other input of which is connected to the "one" output of the flip-flop $295_1$, the or-gate output being connected to the output of the frequency demultiplier 291". The demultiplying network 291" differs from the network 291 of FIGURE 8 in that each of the flip-flops is connected to the symmetrical input of the following flip-flop by its "zero" output.

Figure 24:
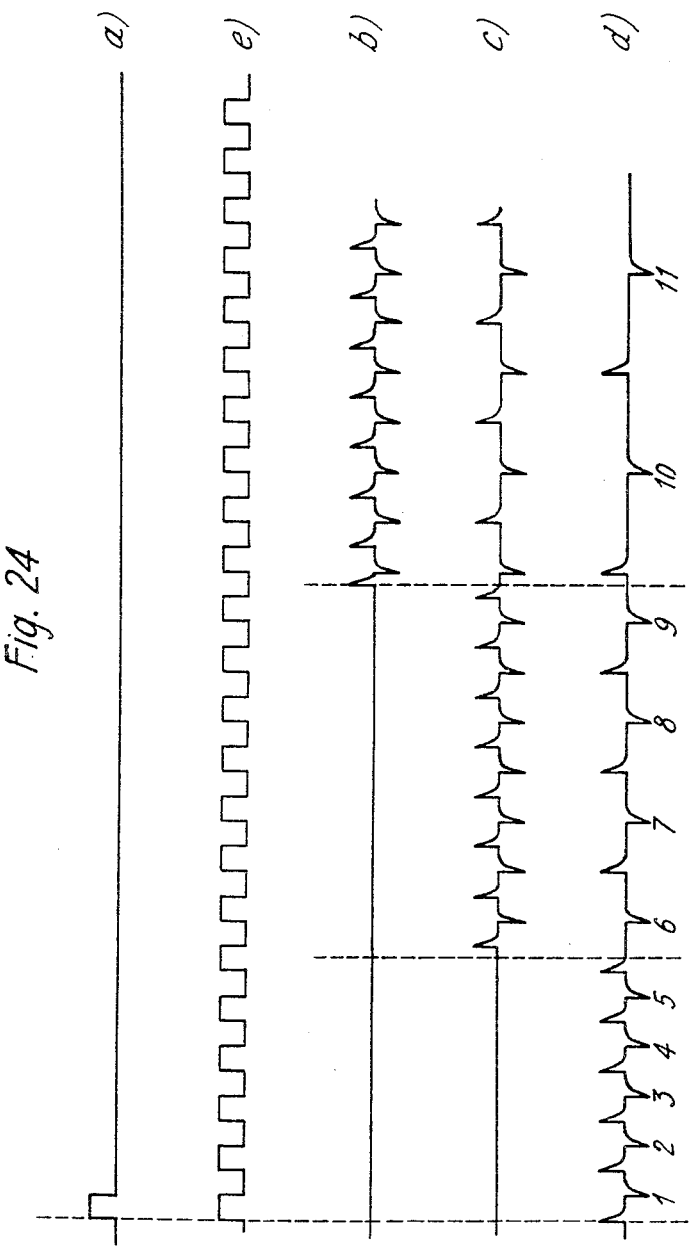
FIGURE 24 is a diagram of wave forms of signals at various places in the encoder shown in FIGURE 23.

FIGURE 24 illustrates the wave forms at various places in the circuit shown in FIGURE 23, the lines of FIGURE 24 having the same letter or number references as the corresponding places in FIGURE 23. The line $a$ represents the transfer signal from the generator 7, and the line $e$ represents the square signal from the generator 3. It is again assumed that all the symmetrically actuated flip-flops are sensitive to negative fronts but that flip-flopping of the flip-flops $295_1$ and $295_2$ follows the appearance of a transition with a delay of from a half-period to one period of the signal from the generator 3. Transitions are assumed to occur for code numbers 5 and 9. The signal delivered by the generator 3 is therefore first applied to position $d$. The first transition which appears (or the code number 5 in FIGURE 24), causes the flip-flop $295_1$ to flip-flop into the "one" state, with the delay just described. The demultiplication network is therefore switched while the generator 3 is in the "one" state. To prevent the appearance of an accidental operative front, the flip-flopping of the flip-flop $295_1$ applies the "one" state, through the or-gate circuit 290, to the place $d$ (and to the input of the counter 5). Simultaneously, the signal which is the inversion of the square signal delivered by generator 3 is applied to the symmetrical input of the flip-flop $291_1$ (position $c$). Signals are therefore produced at positions $c$ and $d$ which are of the shape shown in FIGURE 24. More particularly, the operative fronts corresponding to code numbers 5 and 6 are spaced apart by $0.75\tau_2$ as in the system shown in FIGURE 15.

The appearance with code number 9 of the second transition leads to the delayed application, of the kind just described, to position $b$ of the signal which is the inversion of the signal shown at $e$ in FIGURE 24. The first operative front for flip-flop $291_2$ appears one period of the generator 3 after the occurrence in counter 5 of the transition combination (corresponding to the number 9). Flip-flopping of flip-flop $291_2$ brings flip-flop $291_1$ into the "one" state. At positions $c$ and $d$, therefore, the wave form is prolonged without alteration beyond the transition by one period of the generator 3—i.e., $0.25\tau_3$. The operative fronts corresponding to code numbers 9 and 10 are therefore separated from one another by $0.75\tau_3$ in the required manner.

The decoder for use with the encoding system shown in FIGURE 23 has a distinctive frequency demultiplier design which is shown in FIGURE 25. As in FIGURE 15, the transition levels are 8 and 4 (for 9 and 5 at encoding). The frequency demultiplier shown in FIGURE 25 can be deduced very simply from the frequency demultiplier shown in FIGURE 16, differing therefrom in that flip-flop 1912" has its "zero" output connected to the symmetrical input of flip-flop 1911" and the latter in turn has its "zero" output connected to gating circuit 14; terminals 1920', 1921', 1922' are connected to the appropriate inputs of network 191" through polarity-reversing networks 1970–1972; the generator 13' is assumed to be in the "one" state at the start of the cycle and starts only with the transfer pulse, with the same arrangement as hereinbefore described relatively to such pulse.

The signal wave forms at various places in FIGURE 25 are shown in FIGURE 26, the same reference letters being used for the diagrams and corresponding places of FIGURE 25. The line $a$ denotes the transfer pulse from the generator 17, and the line $e$ denotes the signal delivered by the generator 13'. It is assumed that the code number received is 11. It will be apparent that the first operative front for the counter 15 (such front having the reference 10) appears one period of the generator 13' after the forward front of the sample pulse. This shows why the generator 13 is in such a condition before the start of the restored sample pulse. If this were not so, the first operative front would coincide with the forward front of the sample pulse and the required delay of one period of the generator 13 would be absent.

The arrangement of the operative fronts near the transitions is such that, although delayed as described, the operation of a demultiplication leads to a division by two of the period immediately the transition appears, and so the sequence of operative fronts is as shown in FIGURE 15.

What we claim as our invention and desire to secure by Letters Patent of the United States is:

1. A coded pulse modulation transmission system comprising: means for producing sample pulses time-modulated by a modulation signal; a recurrent counting pulse generator; means for varying in multiples of two the frequency of such generator; means for transmitting over a transmission channel binary-code pulses translating the number of times that the period of the counting pulses is contained in the duration of a sample pulse; a recurrent backward counting pulse generator; means for varying in multiples of two the frequency of the last-mentioned generator; and means for producing restored sample pulses, the duration of which is a number of periods of the backward counting pulses equal to the number represented by the binary-code pulses, the frequency of the counting pulses and the frequency of the backward counting pulses varying by a multiple of two when the generators have produced predetermined numbers of counting and backward counting pulses.

2. A coded pulse modulation transmission system formed by an encoding device comprising; a time modulator of sample pulses; a counting pulse generator; a first chain of binary demultipliers associated with the counting pulse generator; an and-gate circuit receiving the time-modulated pulses and the counting pulses and passing the counting pulses produced during the duration of the sample pulses; a first binary counter connected to the and-gate circuit; and means for applying to a transmission channel in series code pulses translating the code combination recorded by the counter; and by a decoding device comprising a second binary counter; means for applying in parallel the code pulses received from the encoding device to the second binary counter; a backward counting pulse generator having the same frequency as the counting pulse generator; a second binary demultiplying chain associated with the backward counting pulse generator; means for producing pulses of a duration equal to the time required for the second binary counter to be reset to zero by the backward counting pulses, such pulses forming the restored sample pulses; and by means enabling the number of binary demultipliers associated with the counting pulse generator to be controlled by the first binary counter for transition code combinations marked thereby, and enabling the number of binary demultiplier associated with the backward counting pulse generator to be controlled by the second binary counter for transition code combinations marked thereby.

3. A coded pulse modulation transmission system as claimed in claim 2, wherein the number of binary demultipliers associated with the counting pulse generator is immediately increased by one unit when the first binary counter passes with an increase through a transition code combination, and the number of binary demultipliers associated with the backward counting pulse generator is immediately reduced by one unit when the second binary counter passes with a decrease through a transition code combination; and the first backward counting pulse is produced in a time equal to one-and-a-half of the longest counting pulse periods used for encoding, less half the shortest counting pulse period, after actuation of the means for producing pulses of a duration equal to the time required for the second binary counter to be reset to zero by the backward counting pulses.

4. A coded pulse modulation transmission system as claimed in claim 2, wherein the number of binary demultipliers associated with the counting pulse generator is immediately increased by one unit when the first binary counter passes with an increase through a transition code combination, and the number of binary demultipliers associated with the backward counting pulse generator is reduced by one unit after a delay of one-half of the new period which it will take up when the second binary counter passes with a decrease through a transition code combination; and the first backward counting pulse is produced in a time equal to the longest counting pulse period used for encoding after actuation of the means for producing pulses of a duration equal to the time required for the second binary counter to be reset to zero by the backward counting pulses.

5. A coded pulse modulation transmission system as claimed in claim 2, wherein the number of binary demultipliers associated with the counting pulse generator is increased by one unit with an advance of one-quarter of the new period which it is going to take up when the first binary counter passes with an increase through a transition code combination, and the number of binary demultipliers associated with the backward counting pulse generator is immediately decreased by one unit when the second binary counter passes with a decrease through a transition code combination; and the first backward counting pulse is produced in a time equal to the longest counting pulse period used for encoding after actuation of the means for producing pulses of a duration equal to the time required for the second binary counter to be reset to zero by the backward counting pulses.

6. A coded pulse modulation transmission system as claimed in claim 2, wherein the number of binary demultipliers associated with the counting pulse generator is immediately increased by one unit when the first binary counter passes with an increase through a first transition code combination, and the number of binary demultipliers associated with the backward counting pulse generator is immediately reduced by one unit when the second binary counter passes with a decrease through a second transition code combination less by one unit than the first such combination; and the first backward counting pulse is produced in a time equal to half the longest counting pulse period used for encoding, plus one-half of the shortest counting pulse period, after actuation of the means for producing pulses of the duration equal to the time required for the second binary counter to be reset to zero by the backward counting pulses.

7. A coded pulse modulation transmission system as claimed in claim 2, wherein the number of binary demultipliers associated with the counting pulse generator is increased by one unit with an advance of one-quarter of the new period which it is going to take up when the first binary counter passes with an increase through a first transition code combination, and the number of binary demultipliers associated with the backward counting pulse generator is immediately reduced by one unit when the second binary counter passes with a decrease through a second transition code combination less by one unit than the first such combination; and the first backward counting pulse is produced in a time equal to the longest counting pulse period used for encoding after actuation of the means for producing pulses of a duration equal to the time required for the second binary counter to be reset to zero by the backward counting pulses.

No references cited.